(12) United States Patent
Khalid et al.

(10) Patent No.: US 8,286,219 B2
(45) Date of Patent: Oct. 9, 2012

(54) SAFE AND SECURE PROGRAM EXECUTION FRAMEWORK

(75) Inventors: Atm Shafiqul Khalid, Redmond, WA (US); Mustafizur Rahman, Dhaka (BD); Mahruma Khatoon Siddiqua, Redmond, WA (US)

(73) Assignee: Xencare Software Inc., Redmond, WA (US)

( * ) Notice: Subject to any disclaimer, the term of this patent is extended or adjusted under 35 U.S.C. 154(b) by 755 days.

(21) Appl. No.: 12/032,663

(22) Filed: Feb. 16, 2008

(65) Prior Publication Data

US 2010/0031308 A1      Feb. 4, 2010

(51) Int. Cl.
*G06F 11/00* (2006.01)

(52) U.S. Cl. .............. 726/1; 726/24; 707/100; 713/200; 713/100

(58) Field of Classification Search .................. 726/1
See application file for complete search history.

(56) References Cited

U.S. PATENT DOCUMENTS

| | | | | |
|---|---|---|---|---|
| 6,275,937 B1 * | 8/2001 | Hailpern et al. | ............... | 713/188 |
| 6,785,732 B1 * | 8/2004 | Bates et al. | ................... | 709/232 |
| 7,206,814 B2 * | 4/2007 | Kirsch | .......................... | 709/206 |
| 7,493,659 B1 * | 2/2009 | Wu et al. | .......................... | 726/26 |
| 7,509,493 B2 * | 3/2009 | Koti et al. | ...................... | 713/166 |
| 2003/0084329 A1 * | 5/2003 | Tarquini | ......................... | 713/200 |
| 2004/0181788 A1 * | 9/2004 | Kester et al. | ..................... | 717/168 |
| 2004/0205419 A1 * | 10/2004 | Liang et al. | ..................... | 714/57 |
| 2004/0225877 A1 * | 11/2004 | Huang | ........................... | 713/100 |
| 2005/0071668 A1 * | 3/2005 | Yoon et al. | ..................... | 713/200 |
| 2005/0157662 A1 * | 7/2005 | Bingham et al. | ............... | 370/254 |
| 2005/0210035 A1 * | 9/2005 | Kester et al. | ..................... | 707/10 |
| 2005/0262567 A1 * | 11/2005 | Carmona | ......................... | 726/24 |
| 2006/0075500 A1 * | 4/2006 | Bertman et al. | ................ | 726/24 |
| 2006/0130144 A1 * | 6/2006 | Wernicke | ......................... | 726/24 |
| 2007/0022480 A1 * | 1/2007 | Newman | ......................... | 726/24 |
| 2007/0100892 A1 * | 5/2007 | Kephart et al. | ............... | 707/200 |
| 2009/0064334 A1 * | 3/2009 | Holcomb | ......................... | 726/24 |
| 2009/0216802 A1 * | 8/2009 | Nagoya | ...................... | 707/104.1 |

* cited by examiner

*Primary Examiner* — Ashok Patel
*Assistant Examiner* — Andrew Goldberg (57) ABSTRACT

A system and method is provided that makes sure the instruction sets executing on a computer are certified and secure. The system and method further facilitates a generic way to intercept the instruction loading process to inspect a loaded code segment first, before the computer gets a chance to execute the code segment. Further, a profiling component can monitor all executing processes running in a system and profile the behavior of the program. If the behavior is suspicious, established by a set of predefined rules, the profiler can take necessary actions to notify a system administrator and suspend or terminate execution of the program.

14 Claims, 6 Drawing Sheets

Block Diagram

Figure 1 Block Diagram

Figure 2 Active Interceptor

Figure 3 Passive Interceptor

Figure 4 Authentication Framework

Figure 5 deployment module

Figure 6 Different Framework Components

SAFE AND SECURE PROGRAM EXECUTION FRAMEWORK

TECHNICAL FIELD

The present invention relates to program loading, program execution, monitoring and verifying loaded instruction modules inside a program, computer security and, more specifically, making sure that the instruction set loaded inside a program is secure and safe.

BACKGROUND OF THE INVENTION

In modern computing environment security is one of the most important factors. It should be the highest priority to make sure that a computer always executes safe computer instructions to maintain privacy and security. A computer will be connected to the network, and there will be outside attackers who will try to destabilize the computing environment or steal valuable information stored somewhere in the network. The most common way to achieve these things is to find some exploitable hole and then inject some computer instruction that can be executed internally.

Theoretically, there will be always security vulnerabilities, and the possibility that someone will try to push some bad stuff to exploit a vulnerability. Then it's up to the user/computer to deal with this bad stuff. Most of the users are not expert and, for example, can easily double click on an email attachment to welcome this bad stuff. Or sometimes the OS or some running program will automatically welcome bad stuff because of exploitable security holes in that application or OS.

An antivirus program is a kind of passive protection. It can scan files for possible infection; it can scan memory for similar things. The scanning process is assisted by some preset signatures to flag that memory or files that are infected. However, there is no easy way to make a conventional anti-virus application smart enough to determine any newly written future virus. Firewall applications typically block requests from unknown or suspicious sources. However they can't block legitimate requests. For example, users need to browse the Internet, send email, use other network resources, and communicate with other computers in the network. Sometimes an unintentional or ignorant act can cause problems. An email attachment might contain bad instructions. Or an employee might download a file from the Internet and execute it locally, eventually installing bad stuff on the computer. Therefore, those virus or firewall based protections are not good enough to identify new innovative future attacks. In this invention, we present a novel approach that can identify bad instructions modules in the system at the time they are loaded into the system and do the verification using a unique easily deployable authentication framework. The proposed invention makes sure that the instructions running in the system are safe.

Local Authentication Framework can acquire knowledge from the global Authentication Framework (AF). AF already knows what modules are available that can be safely executed on a local system. The knowledge base of the framework can be adaptive and continuously learn about new modules relating to new products, updates available to users, or new findings on a module or product. AF helps apply the knowledge acquired from the global AF to end user system to make the computing system more secure and safe. The Authentication Framework helps the system administrator set rules and policies to define certified instruction set/modules to run across system computers. This makes the network environment more efficient and manageable because the administrator can control what can be run in the system and what can't. If some certified instruction module becomes vulnerable to attack, the administrator can uncertify the module and update its central database with a new certified module (for example, available from vendor). In that case all computers in the network can pick up the certified module quickly and automatically. Also, this helps the administrator manage licensed products. The administrator can certify program modules based on user account, or machine account. That way, the administrator can centrally manage that no unlicensed products are in use in the network.

SUMMARY OF THE INVENTION

The following presents a simplified summary of the present invention in order to provide some basic details of some aspects of the invention. This summary is not an extensive overview of the invention. It is not intended to identify key or critical elements of the invention or to reduce the scope of the invention. Its sole purpose is to present some concept of the invention in a simplified form; a more detailed description is presented later.

The present invention provides a system and method to intercept and manipulate the program and instruction loading process, and verify that loaded instructions are certified and safe before a computer actually executes them. Also, it can replace any uncertified instruction set or modules with compatible certified instruction/modules to deploy any security patch quickly and in a more manageable way.

When an OS loads a program, it typically allocates some memory and loads required instructions in modules that the program depends on. A call interceptor intercepts the loading process and figures out which modules the OS loader is trying to load. Then for each program module it checks with the AF to verify that the module is certified safe to load and can be loaded based on given credentials. The credentials might include user name, machine account, and module information (time stamp, vendor info, size, checksum etc.). The AF resolves the module load info using a resolving mechanism and generates an action policy record something like: given module is unsafe to load; given module needs to be replaced with an updated module; etc. Then a deployment module takes necessary action to implement the action record. If needed, the deployment module can replace the local module with a certified module and load the certified one instead.

The Authentication Framework can work in a way similar to the way the DNS framework works. The framework can maintain some local table with some information related to module info and policy local to the system. When local tables don't have enough information, the framework can contact a remote authentication server to retrieve more information. Initial data in the local table can be updated by contacting a remote server and inspecting the local system. A module can be uniquely identified by a combination of its name, size, checksum, vendor info, etc. Each module can have some attributes entry that specifies which user/machine can execute them. A remote authentication server can contact additional top level servers in the framework to resolve authentication requests if needed.

AF is an important independent piece that will facilitate the cataloging of all publicly available instruction modules. "Instruction module" is a place holder for computer instructions that can control the execution of programs that eventually dictate the end result a user gets from a computer. DLL, EXE, web scripts, java class, etc. can be considered as program modules. A catalog containing module information is updated regularly as new program modules become available for public uses through different trusted channels including retail products, web downloads, etc. It is also possible to catalog modules within a certain scope. For example, in the corporate environment, a corporation might have proprietary program modules that need to be authenticated within their network only So the authentication server serving the private network can have a catalog containing module information local to the network.

The framework can be implemented in many ways that combine these core elements:

a) Clients that need authentication service
b) Servers handling those authentication requests
c) A set of protocols to establish communication between clients and servers in secure ways
d) Optimization modules that cache authentication requests in different stages
e) A catalog service to catalog available modules that will be used by the authentication servers
f) A way to resolve authentication requests the way Internet domain names get resolved.

Another aspect of this invention is applying module verification processes in managing program licensing. Every time a product is launched, it will check with a table whether the loaded module is certified. An administrator can set policies to certify modules based on user or machine account and possibly licensing period. Administrator can also specify actions to be taken if users try to load a module with an expired license, that is uncertified, etc. So the capability can be enhanced in many ways.

This is analogous to securing or protecting the human body system: the human body is always vulnerable to attack from internal or external micro organism like bacteria or viruses. Constant screening, diagnosis, and some built-in antibodies can reduce the scope of those attacks and reduce the prevalence of infection from micro organisms significantly. Also, there is a central authority like the FDA that can set standards and certify what kinds of food or preventive medicine are safe for public health. Analogous to that system, this invention has: a) a monitoring process modules that work like a screening process; b) an intercepting module as a kind of antibody or preventive medicine; c) an Authentication Framework that sets standards for what can be executed, like the FDA does; and d) a deployment module that acts like a care facility to make the computing system more secure and safe and less vulnerable.

DETAIL DESCRIPTION OF THE INVENTION

The present invention is now described with reference to the drawings. In the following description, for purpose of explanation, numerous specific details are set forth in order to provide a through understanding of the present invention.

Figure 1:
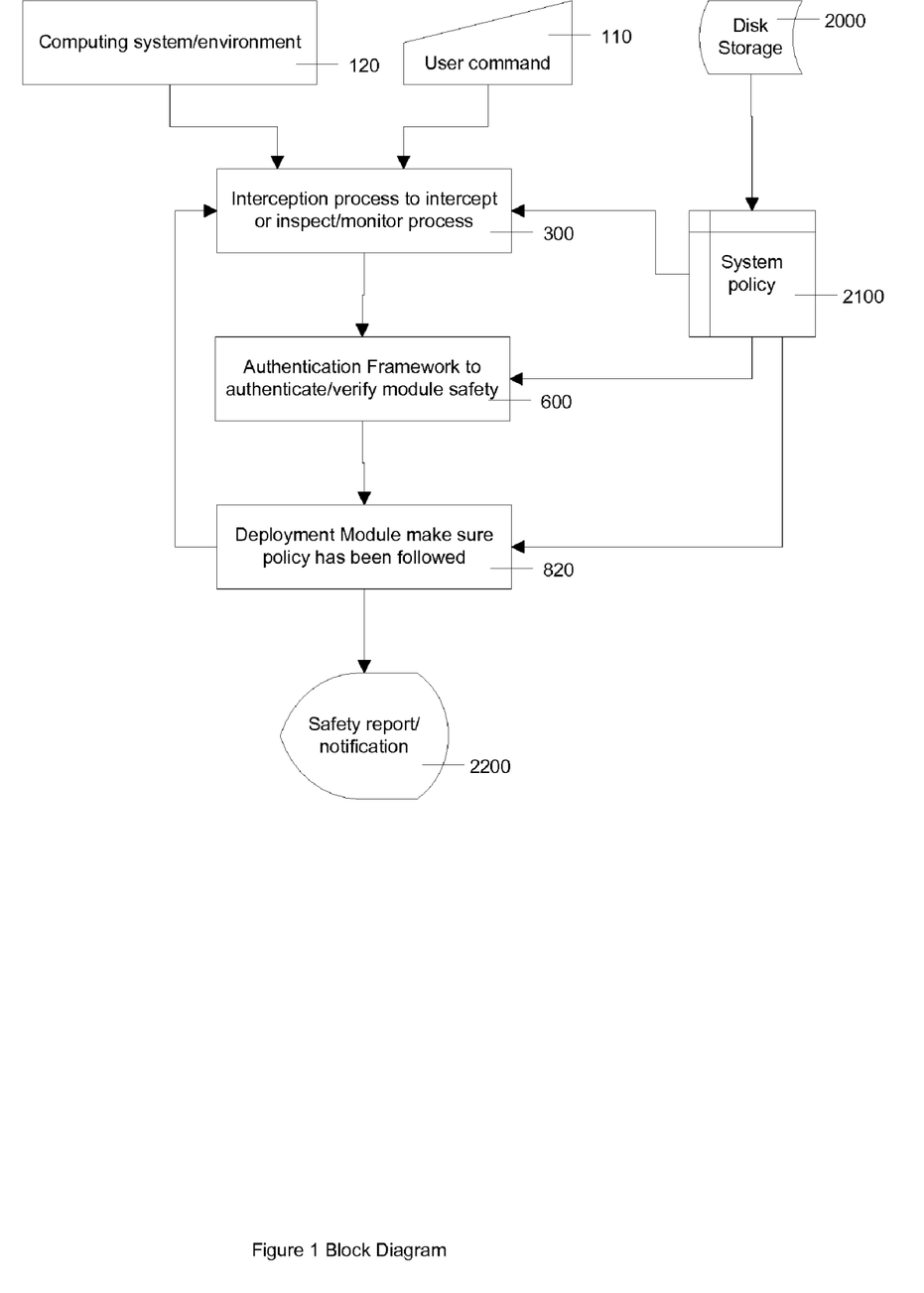
FIG. 1 is a Block diagram of call Intercept processor, Authentication Framework and Deployment module

FIG. 1 shows block diagrams of different components in a typical environment. Block 120 is a computing system representing any computer system with any hardware configuration running any operating system such as Windows, UNIX, etc. Users can run their applications, such as web application, word processor, database application, etc. on the system. Block 110 shows user interaction commands: they way a user might initiate running applications on the system. User interaction might be as simple as clicking on an icon on a computer screen, or activating an application remotely, or running an application on some preset schedule. Block 2000 is disk storage containing the necessary persistent information different components might need. Block 300 is the component responsible for checking which modules are loaded or getting loaded in the system. Block 300 might be embedded in any running process on the computing system 120. Block 300 might monitor routinely which instruction modules are already loaded on 120. For example, while running an application, say, hello.exe, the application might load more modules, say, foo.dll and goo.dll. The user might issue a command to run hello.exe on 120. The Interceptor will report the event actively when hello.exe, foo.dll, and goo.dll get loaded and will initiate some process to complete before hello.exe is executed on the system. The Interceptor will report passively that hello.exe is running on the system and that hello.exe has loaded components goo.dll and foo.dll. The system administrator can configure how the Interceptor should work.

Block 600 is the infrastructure in combination with a set of protocols, connected servers where a request from 300 may be served. Block 300 might issue some query if hello.exe, foo.dll, and goo.dll are recognized components that can be safely run on the system. The system might receive some feedback like the module is not safe to run on the system. Block 600 defines how a request should be formed and constituted. Block 600 defines how the request should be delivered, and it defines the response as well. A computing system can be part of a framework that works as a remote server serving a set of queries. Those servers will have access to some catalog containing information about the modules a computing system might use. The catalog can be used to build system policy as shown in Block 2100 that is suitable for a computing system or a private network. Another component in the framework might dynamically update the catalog or system policies whenever new modules or information associated with new modules are available, or new information on a module is found, or the system needs to be configured.

Block 2100 constitutes system policy which is a table containing a collection of information about available modules relevant to the scope of the framework. System policy can be constituted from a catalog of modules that are relevant in a network. For example, in a private network there are certain modules that are only used in the private network. A system policy can be developed based on those specific modules and network needs.

Block 820 shows deployment modules that can make sure a policy is properly followed. System policy might define that "foo.dll with some signature S" can safely run in the network but "foo.dll with signature Y" can't run.

Block 2200 is the optional report module that basically compiles information on any violation of system policy in the network or system and reports to the administrator.

Figure 2:
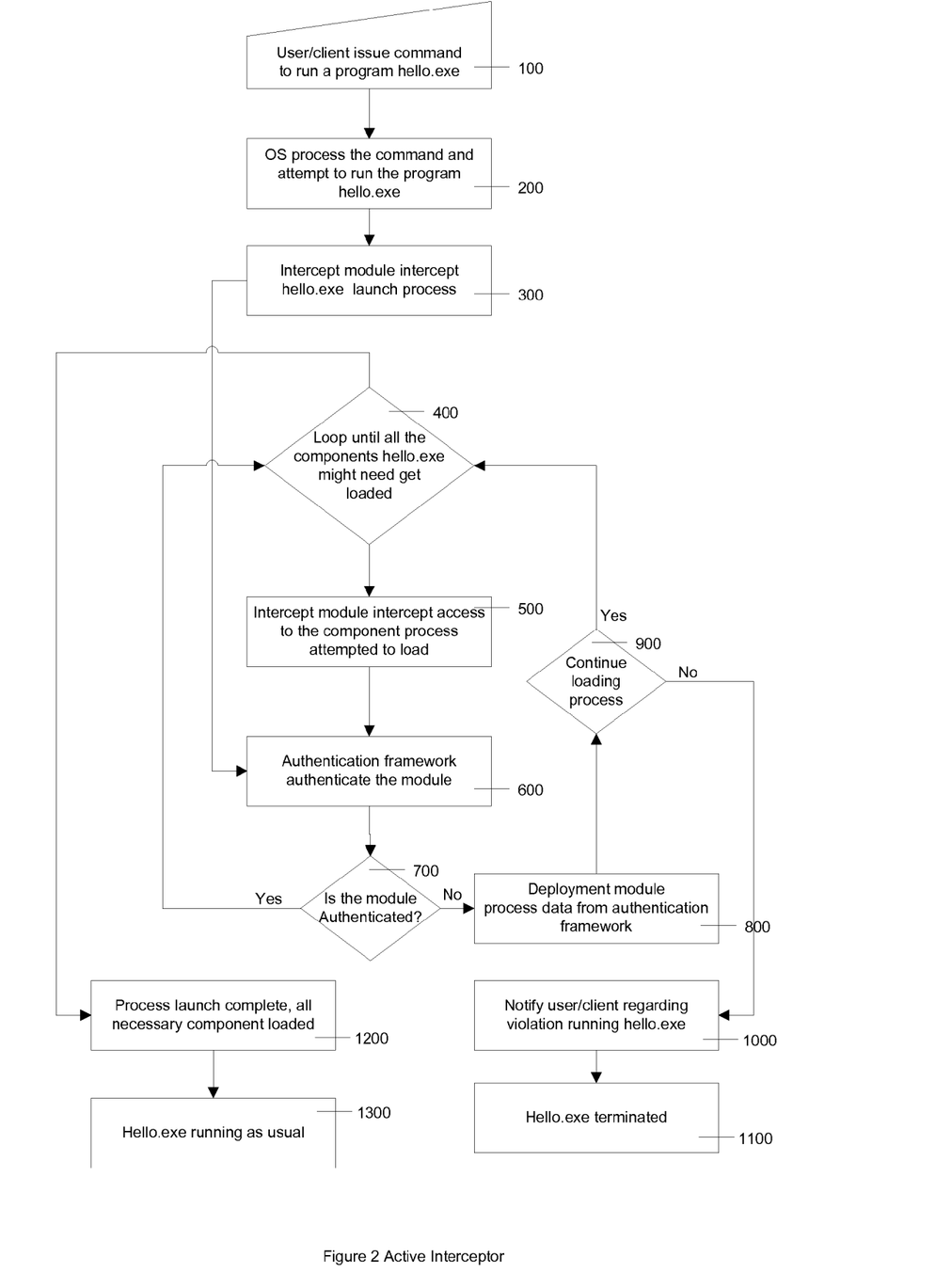
FIG. 2 is a flow diagram of how active call Intercept processor works.

FIG. 2 shows how an active interceptor can be implemented in a typical computing environment and how it would work. In FIG. 2, module 100 issues commands to launch an application. Say a user issues a command to lunch an application, hello.exe. Block 200 is part of the OS that interprets the user command and initiates launch sequence. Launch sequence typically covers allocating memory, reading hello.exe from disk, loading all the modules that hello.exe depends on, etc. Block 300 is the key component which is capable of intercepting all the calls that the OS uses to load all the modules. Those calls might be mapping hello.exe into memory along with its dependent modules. Dependent modules mean that hello.exe needs other modules that it has dependency on to be loaded as well. Thus the interceptor takes a first look at all modules before the OS gets a chance to use them for hello.exe. The interceptor knows which module is about to get loaded (say foo.dll) for hello.exe program. Then it extracts some information from foo.dll and makes a request to the authentication framework module represented in Block 600 asking, "A program is about to load foo.dll with signature X—what should I do?" Signature X might be some unique ID that can uniquely identify the module. Every component in the framework will understand the signature and what it corresponds to. Framework will resolve the request and send the caller some feedback such as "the module is safe to load" or "the module is completely unknown" or "the module is marked as a risk to the system" or "the module needs to be patched" or any combination. Once the interceptor receives the result from the framework, it can allow the OS call to successfully continue the hello.exe loading process. Or it can deliver the result returned from the framework for deployment module 800 to implement, to make sure that loading the program with dependent components doesn't violate any local system policy. The depoloyment module analyzes the result and checks with local system policy (if any) to determine action items. In some cases the action might be to replace the module with a newer or different version of the module, or to delay the execution to comply with the license, etc. If the deployment module fails to resolve the issue raised by local policy or the framework it can request that the interceptor terminate the loading sequence and ask report module 1000 to notify the user or administrator with appropriate information explaining what happened.

Figure 3:
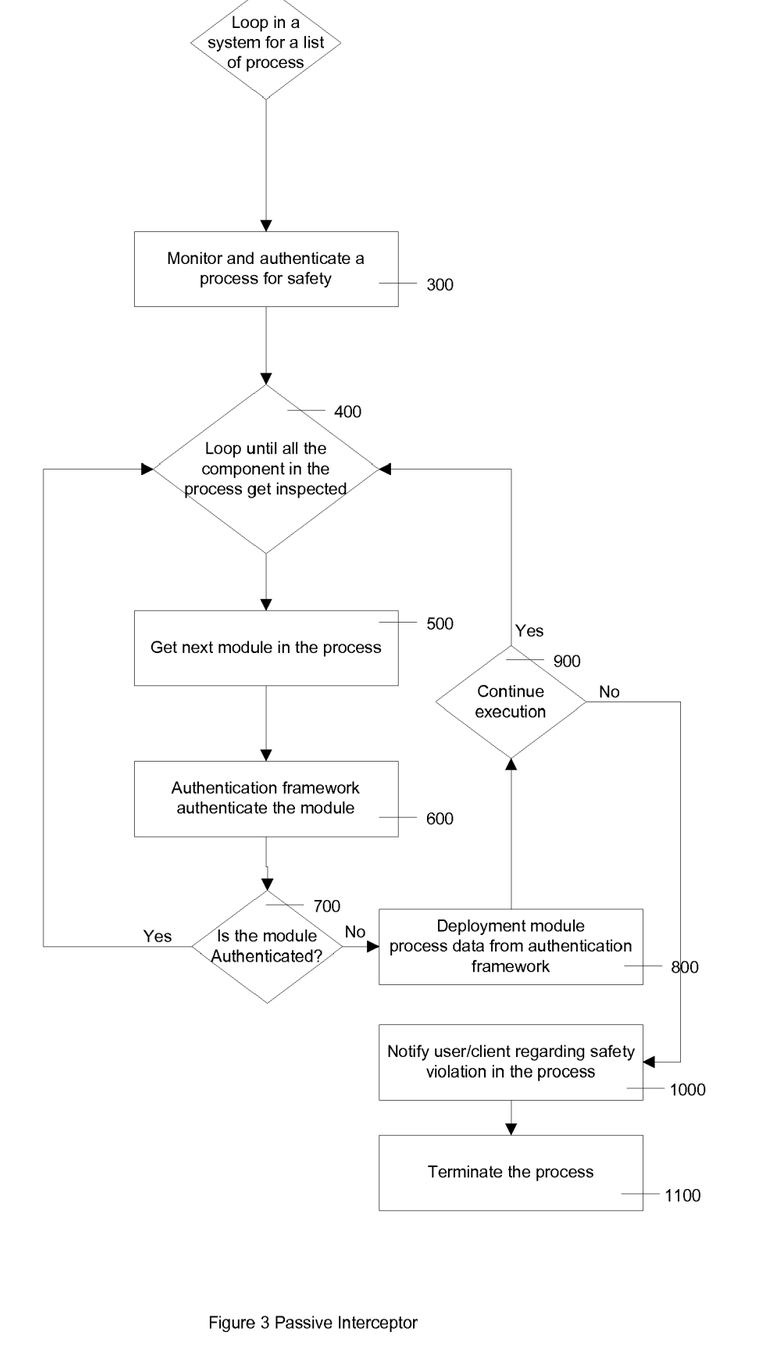
FIG. 3 is a flow diagram of how passive call Intercept processor works.

FIG. 3 shows how a passive interceptor can be implemented in a typical computing environment and how it would work. Contrary to an active interceptor, a passive interceptor is a kind of monitoring process that looks at what modules get loaded in a program and verify if those modules are the right ones. In FIG. 3, module 300 starts by inspecting all programs loaded in the system. It walks through each module M loaded in a process P. then it extracts some information from module M to construct some identification signature S. The signature can be a generated computing hash on the module, using module creation time stamp, the vendor who created the module, if available, etc. The signature must be unique and well understood by the different components in the framework that must identify the same module. The interceptor then send a request to the authentication framework asking if any action need to be performed with the module M with signature S. Authentication framework resolves the request and sends the result to the interceptor. The result might say "the module is not recognized" or "the module needs to be replaced by a newer version" etc. The interceptor then contacts the deployment module if any action needs to be taken to comply with the AF result and system policy.

Figure 4:
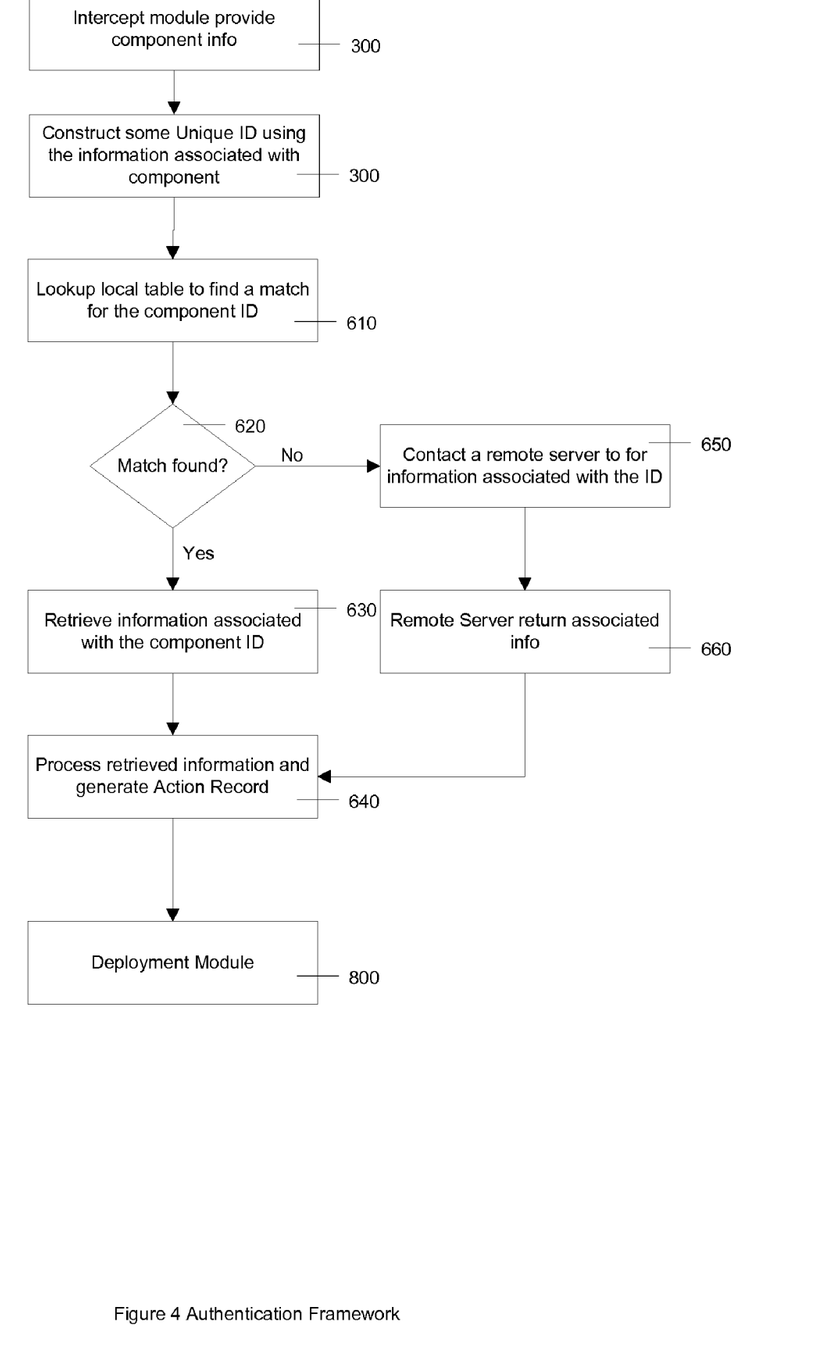
FIG. 4 is a flow diagram how Authentication framework works.

FIG. 4 shows how an authentication framework can be implemented in a typical computing environment and how it would work. Authentication framework is the core component, the central nervous system, of this authentication mechanism. This can be implemented as a module in a single computer system with some local scope or it might be implemented as a client module in all computer systems with the support of server modules deployed in the network where client modules can talk to server modules to resolve requests. A server might contact other servers to resolve a request if needed. In FIG. 4, module 300, the interceptor collects information from a module, say, M. The framework defines a set of protocols so that different servers and clients' modules can interact with each other. Module 300 constructs a request for the module M using some functionality provided by the client framework module. It then sends the request to that framework which is the client framework module in the local system. The local client framework module maintains a local table that contains information about local policy, local user info, local execution environment, local cache, etc. To resolve the request for module M, it searches the local table to find a match; if a match is not found it contacts a remote framework server to resolve the request if needed. The remote server might contact additional servers to resolve the request if needed. The local framework module might scan the local system initially to populate the local table or contact a remote server to initialize its local table. An administrator can configure how the initial state is populated. Remote servers can be connected to some database containing module information. Another process periodically updates the database with up-to-date information.

Figure 5:
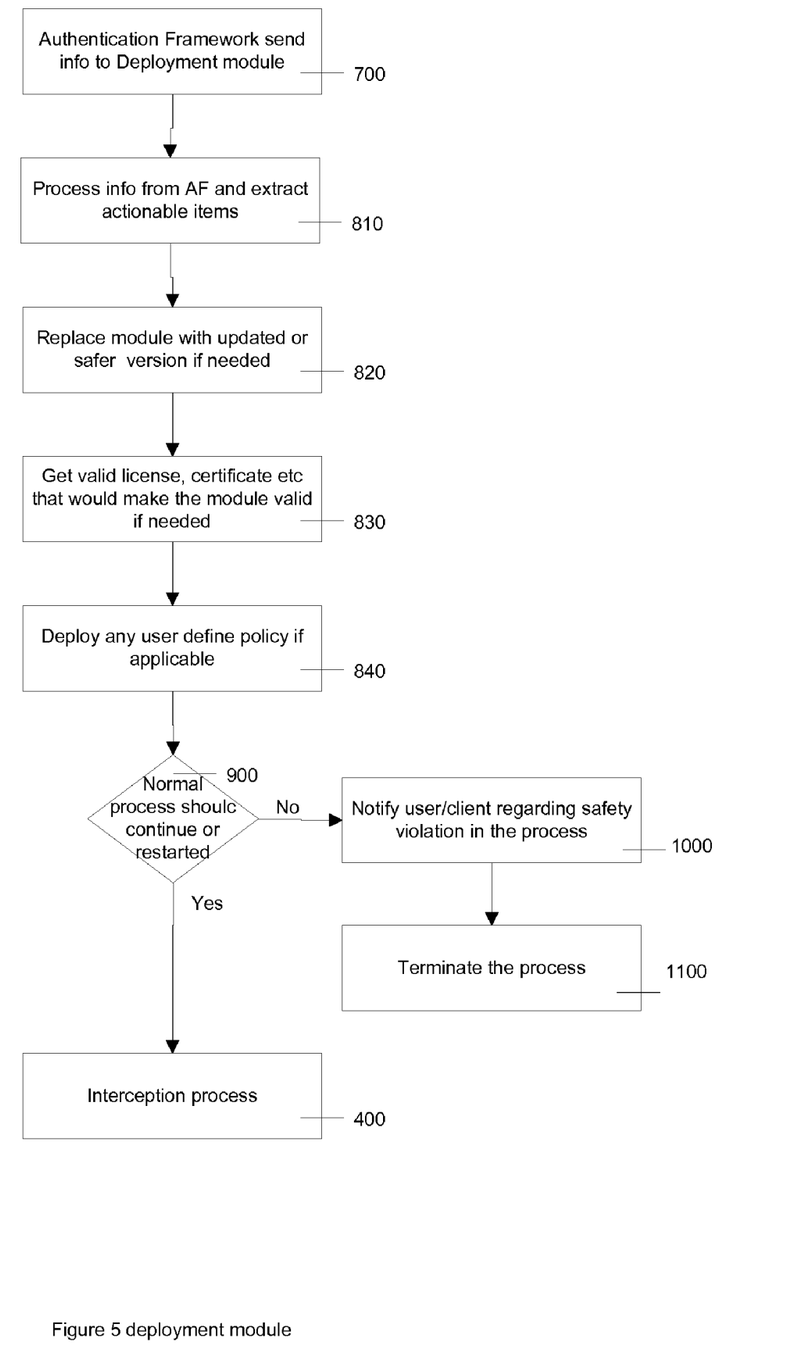
FIG. 5 illustrates how deployment module work

FIG. 5 shows how a deployment module can be implemented in a typical computing environment and how it would work. This implements any action items computed from local policy and framework results. Local policy is the policy set by a local administrator for the local system. Local policy might say "don't allow execution of any module not authenticated by the framework" or "if a newer version of module foo.dll is available, always use that module" or "if user U is launching hello.exe, don't allow that". These policies become part of the local framework client module. An administrator can also set policy only applicable to a private network. When the interceptor issues a request to the authentication framework, "Can user U execute hello.exe with signature S?" the local framework module might check its local table to see if the request can be resolved. Say it finds some local policy stating "User U can execute hello.exe if signature is valid." Then it checks again if the local table contains the signature identifying hellow.exe. If the signature is not found it contacts a remote server. The remote server checks its database and resolve the request, for instance, "hello.exe with the signature has a severe security hole and must be replaced with a newer version." When the deployment module receives the result, it might contact some server (which may be another part of the framework) to copy a newer version of hello.exe. The authentication framework might not find the signature. In that scenario, the file might be infected by a virus or some temperament might have caused the signature to change. The deployment module might try to fix the signature the way an antivirus application might try to disinfect a module. It might also try to replace the module if the original signature can be retrieved in some way. File location, vendor info, date, etc. might lead to a unique combination that can be used to look up the original signature. Once the original signature is found, another database can be searched for the original file to replace.

The authentication framework can be used for licensing management. An administrator can set some policy applicable to the local system or within a network. The policy can be something like "hello.exe can be launched on a predefined number of computers in the network" or "hello.exe can be launched within a predefined time on a system with a user account in a given set." When hello.exe is launched on a system, the interceptor in AF intercepts the modules loaded by the application. The intercepted modules are then checked against the AF database and with the user info. The AF can check with local policy and return "time has expired" or "more instances of the module can't be launched" or "the user doesn't have a license to run this" or "user needs to pay subscription first."

Figure 6:
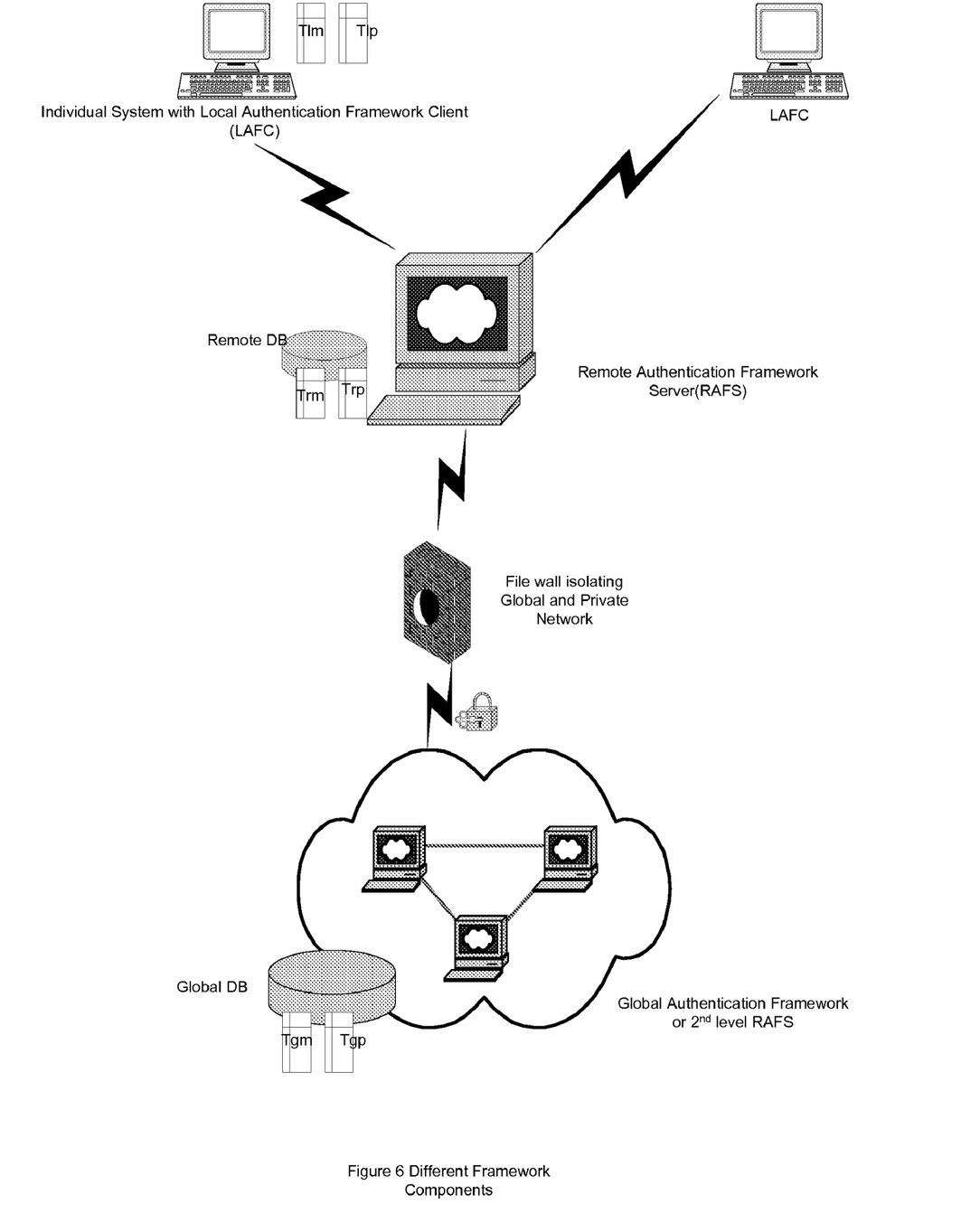
FIG. 6 Different Framework Components

FIG. 6 shows different components of the AF with more examples. In FIG. 6, the Remote Authentication Framework Server (RAFS) is the server that has access to a database (DB) that contains module information. RAFS might be dedicated to a private network or be part of a global network. A network administrator can set policy which will be part of the DB accessed from RAFS.

When a user set up a system S it needs to have Local Authentication Framework client (LAFC) module AF. AF initializes its local database D with at least one table Tlm that contains module information. Tlm has associated version numbers that define how a record is constituted for a module. <Module Signature, Module Name, Module Creation Date, Vendor Name> can represent an individual field or column in table Tlm. A different table version can have a different set of attributes. Module Signature is a unique ID that uniquely represents a module. Module signature is computed applying an algorithm A(i) over a module. Different version of A will represent different Signatures for the same module. For example Module Signature can be MD5 hash computed over the module taking whole or part of the module. The version of the algorithm can dictate if MD5 or other algorithm was used over whole or part of a module.

The administrator configures the LAFC to trust all the modules at a given time and initializes the Table. At that point, LAFC scans the system to populate the Tlm. The administrator configures which remote Authentication Framework server (RAFS) it needs to contact when needed. This AF configuration can be done remotely and automatically as well. The administrator can set local system policy that sits in another table Tlp in D. The administrator can set any kind of policy to populate Tlp and AF can interpret. LAFC can contact a remote Authentication Framework Server to sync-up its Table Tlm and Tlp if needed.

When a user attempts to run an application on system S, the LAFC interceptor intercepts modules loaded by the application, then consults with AF DB and takes necessary action. The user can simply download an application from the Internet then, while attempting to run the downloaded application, the LAFC interceptor intercepts the event, computes data including signature to identify the module, searches for the module in the local DB, and finds no hit in its local DB. It then contacts the remote AF server. A few scenarios can happen:

1. The remote AF server can have a strict preset policy not to allow any new module in the network with full user account privilege. In that case the user can try to run the application with a lower privilege system account that has restricted user access that the remote AF server can allow. AF can deny the running of any unrecognized module.

2. Remote Authentication doesn't find any hits in its DB, and preset policy allows running any authorized module. It then contacts a more remote AF server to check if the module can be authenticated.

3. RAFS doesn't find its module signature in its DB. It then contact second level RAFS. Second level RAFS finds the match and sends it back to the first RAFS. RAFS then might update its DB and send the information to the LAFC. LAFC updates its local DB if needed and allows the application to run smoothly.

4. RAFS find the match, however it finds a policy associated with the module that can be interpreted as "the module has expired" or "the user needs to pay for the subscription."

When LAFC receives the result, the deployment module in LAFC takes necessary actions.

5. RAFS returns that the signature was not found. The deployment module in LAFC tries to see if the module is infected by a virus that caused the changing signature. It will try to scan the module for known virus signatures, and if found it will clean the module and try to re-authenticate.

A set of protocols define how client and server modules should communicate. When LAFC send a request to RAFS to authenticate a module M, it combines the request as <Module Signature, Algorithm used to compute signature, Userinfo>. When RAFS searches the DB it must make sure that the algorithm used to compute signatures on both end are the same. Protocols define how the initial state of DB in LAFC is created and synced up with the global DB. Protocols define how data from server clients are interpreted by participating trusted parties. Communication between LAFC and RAFS must be very secure and some data can be encrypted as defined by the protocols.

Interconnected RAFS with global database (DB) components constitute a global Authentication Framework. The global DB is populated with module information from trusted sources. A single DB or multiple DBs are managed by different RAFS. The RAFS in private networks or an individual LAFC will know the location of any available global RAFS. The DB contains few tables: Tgm for module information, and Tgp for policy associated with modules. Each entry in Tgm is populated by extracting information from instruction modules. Record of Tg will be something like <Module Signature, Module Name, Vendor Info, Creation Date, PolicyID Number>. Module signatures are calculated using some algorithm A(i) supported by the AF. When LAFC send some request to RAFS, the request contains how the module signature was computed so that RAFS understands how to match the signature. A different process can update the DB when a new instruction module is available.

It's possible that in some environment the Remote Authentication Server is not there or its DB is totally empty. Or it's possible to have a network without any remote authentication server. A framework component can connect with other framework components to share information and sometimes act as a master framework component and playing the role of Remote authentication server. Or the whole framework might be just a simple system at home without any interaction with other framework components.

With a single system framework, it might take some input from its user to educate itself. For example, it might ask the user to provide the actual sources of all installed software. Then it can scan those sources to gather intelligence and build a safe rating table for safe program modules. Or it can use the current system as a checkpoint and use all existing program modules as trusted. The user can check point the system immediately after buying the system or building a new system, then check point again every time the user upgrades system with software from trusted sources. This way the framework can scan the system after every check point and collect necessary information. The framework might ask the user to set initial policy rules which can be as simple as "don't allow loading any new program module on this system" or "don't allow any program module or update operation to change any binary files on my system" or "don't copy a new binary in my system."

When a user browses the Internet, a browser application might try to install a new component. The interceptor will catch the operation that the browser is trying to copy a binary file. The authentication framework will see that the new module is not known and then the policy component will see that there is a rule set by user "don't allow a new binary to be copied into the system" and simply deny such operations. In the same way, when a malicious virus tries to change some binary in the system, it would be blocked.

In a network environment, the framework can learn from the activities in other framework components with very minimal input from users. For example, when a framework sees a new module, it can communicate with other framework components to figure out if other framework components know the module as a safe module. If other framework components certify that the module is good, the framework will allow loading the module and still provide a secure environment where users need not add any input their systems.

An exemplary embodiment of a safe program execution framework:

A safe program execution framework is constructed using:
 a) a call intercept processor to inspect or intercept what program or data module is getting loaded or already loaded in a process or what APIs are going to be called,
 b) a policy component with a set of rules and means to enforce those rules to allow or block operations,
 c) an authentication framework to gather intelligence about program modules, API call sequence or data being used across network.

The framework includes a collection of computer systems each running framework component and interact with each other.

The framework includes one rating table that contains different ratings of program module that can be used to evaluate some program module, and a policy table to contain set of rules that can be applied on program modules.

A program or a data module refers to any program files like files with EXE DLL OCX extension or a program script file that can be used to run a program, or a table from data base that can be used in a program.

The framework shares information or rate information to build intelligence what is safe to use and not safe to use.

The framework rates some information with low rating if smaller number of member of the collection is exposed to it for a smaller time and will rate information with a higher rating when many members are using the information for an extended period without any problem.

The call intercept processor determines what program module is going to be loaded or already loaded in a process by using:
 an active intercept processor that intercept program module load before any computer instruction or data in that module get a chance to be executed or being referenced in the process, and
 a passive inspect processor to inspect a process for modules already loaded by inspecting some process data structure or using some OS supported functions.

The call intercept processor constructs a unique ToBeValidated ID by extracting one or multiple module attributes like hash value of module content, checksum/signature in the header, File attributes of the module file, pattern of API call sequence data content, or any info that can be used to identify them uniquely.

The call intercept processor further forms ToBeValidated Module record using the module version info or combining Module ID with some system attributes like user account info, CPU ID, machine info etc.

The framework collects intelligence by contacting other framework component across the network or by contacting a master framework component. The master framework component is connected with multiple framework components and exchange information and rate them if they are safe or unsafe by looking at how information are being used.

The framework creates rules for policy component based on gathered intelligence, existing rules in the policy component, and taking some feedback from end users.

The framework creates a rule to deny loading a program module if the module is new or is not recognized by other framework components, or user feedback doesn't allow loading the module thus giving a low rating to the module.

The framework creates a rule to allow loading a program module if the module is from an established known source, or is being using used by other framework components for extended period of time without issues thus giving a high rating to the program module.

The framework creates a rule to rate any kind of information used in the network used on its uses response and create safe rule for the system.

The framework includes a) a local client module that try to get a rating for ToBeValidated module ID using information stored in a local rating table, if can't be resolved using local rating table contact master framework component if available, and b) a local or master framework component that can get or generate rating for any ToBeValidated module ID using local rating table accessible to the framework component or by contacting other framework components.

The policy component blocks any program module from loading or block any operation if a policy record(s) stored in policy table identify the module information as unsafe with low rating.

The policy record contains information about program module or API call sequence containing at least one of the following:
 the module shouldn't be loaded,
 module can be loaded disabling some features,
 module should be replaced with another module.
 renew license of the module,
 unsecured attempt to execute, terminate the process,
 module uses set to expire at some time,
 any actionable item on module or process.

The framework contains an update method to update local rating or policy table gathering information from other framework components.

The rating table contains information of known code segments and related licensing policy or their update information.

The master framework component updates rating and policy table in other framework components guided by a schedule.

The framework contains multiple master framework components interacting with each other to update their rating and policy table and connecting to a top level master of master framework component where they al together form a larger simplified safe execution framework.

The framework includes a method to set policy and enforce it to achieve one or multiple of the followings:
 report the administrator through available reporting mechanism, terminate the program or disable certain feature in the current program,
 in case of license violation, renew the feature that has the segment, update the program module if necessary,
 renew or initiate subscription of a feature is necessary, any helpful action/logging action that might help system user in any way.

The descriptions above include examples of the present invention. It is not possible to describe every conceivable combination of components or methodologies for the purpose of describing the present invention. However, someone with some general skill in the art may find some combination steps, components, or methodologies to implement the main theme of the present invention to achieve the same goal.

Accordingly, the present invention is intended to embrace all such alternations, modifications, and variations that fall within the sprit and aspect of the appended claims.

We claim:

1. A system to run computer software applications in a secure way, comprising:
   a) at least one computer to run an application;
   b) a call interceptor to control a load operation of one or more application module dlls while loading the application in computer memory;
   c) a rule table containing one or more rules associated with the application module that defines if a module is unsafe to load, or if a module needs to be replaced by another updated module;
   d) a scanning component to gather intelligence about the application module by scanning installed application modules and installation sources;
   e) an intelligence gathering component that collects information about installed application modules on one or more computers and creates intelligence by comparing installation information, and updating the rule table;
   f) said rule table contains a rule that marks any module as unsafe to load if the module is not a member of an approved list;
   g) said rule table contains a rule that marks a module as safe to load if more than a set number of computers in a network are using the module;
   h) said rule table contains a rule that marks a module as unsafe to load if the module is installed on less than a set number of computers;
   i) a computer acting as a master framework server by communicating with multiple computer systems to share and distribute rules;
   j) said rule table contains a rule for application modules that contains licensing information and how to update the module;
   k) said rule table contains a rule that marks a module safe if the module is installed on a particular system marked as highly trusted;
   l) a deployment step that extracts one or more matching rules in the rule table for the application module and applies the rule to discontinue application loading if a module is unsafe to load, or to continue application loading with an updated module if the module needs to be updated.

2. A system as recited in claim 1 further comprises:
   an API interceptor to monitor API sequences to be called in said application; and
   an API call rule table that defines how a set of API will need to be modified when the API sequences match.

3. A system as recited in claim 1 further comprises a mean to allow users to modify and update the rule table.

4. A system as recited in claim 1 further comprises a rating table that contains one or more ratings of said application module, where rating is retrieved based on how said module is being accessed.

5. A system as recited in claim 1, wherein said application module is a member of group consisting of data files and program files with machine code.

6. A system as recited in claim 1, wherein the call interceptor intercepts application module load operation before any computer instruction in that module get a chance to be executed.

7. A system as recited in claim 1, wherein the call interceptor constructs a unique signature by extracting one or more attributes from a group consisting of hash value of module content, and module header information, and file attributes of the module file, and pattern of API call sequence used to access that module, and module version info, and user account info accessing the module, and system info accessing the module.

8. A system as recited in claim 1, wherein said master framework server consolidates rule tables from multiple computer systems.

9. A system as recited in claim 1, wherein said master framework server updates rule tables in other framework components at a scheduled time.

10. A system as recited in claim 1, wherein rule table contains a rule from a rule group consisting of:
    the module shouldn't be loaded, and
    module can be loaded with some features disabled, and
    module should be replaced with a new module, and
    renew license of the module, and
    module access is set to expire at predetermined time.

11. A system as recited in claim 1, further comprises helper components that perform tasks from a task group consisting of:
    a) report the administrator through a reporting mechanism, and
    b) terminate the program, and
    c) disable certain features in the current program, and
    d) update the license, and
    e) update the program module, and
    f) renew subscription of program features, and
    g) initiate logging actions to flag load events.

12. A method to run computer software applications in a secure way, comprising:
    a) intercepting load operation of one or more application module dlls during loading of the application in computer memory;
    b) creating a rule table containing one or more rules associated with the application module that defines if a module is unsafe to load, or if the module needs to be replaced by another updated module;
    c) updating the rule table by scanning one or more computers and gather intelligence about application modules by inspecting installed application modules;
    d) collecting information of installed application modules on one or more computers to create intelligence by comparing installation information, and updating the rule table;
    e) retrieving one or more matching rules in the rule table for the application module;
    f) adding a rule in said rule table to mark any module as unsafe to load if the module is not a member of an approved list;
    g) adding a rule in said rule table to mark a module as safe to load if more than a set number of computers in a network are using the module;
    h) adding a rule in said rule table contains a rule to mark a module as unsafe to load if the module is installed on less than a set number of computers;
    i) a computer acting as a master framework server by communicating with multiple computer systems to share and distribute rules;
    j) adding a rule in said rule table to update modules or it's licensing information;
    k) said rule table contains a rule for application modules that contains licensing information and how to update the module;

l) said rule table contains a rule that marks a module safe if the module is installed on a particular system marked as highly trusted;

m) enforcing the matching rule to discontinue application loading if a module is unsafe, or to continue application loading with an updated module if the module needs to be updated.

13. A system to run computer software applications in a secure way, comprising:

a) a server component to collects and consolidate intelligence of one or more installed modules on interconnected computers, create rules based on intelligence and push those rules to client computers;

b) a client agent to collect information of the installed modules by scanning the system and installation sources and sending said information to the server components;

c) a rating component that ranks the installed module based on installed instances and giving weight to each instance, then mark the installed module as unsafe if the rank for the installed module falls behind a preset rank value;

d) a rule table to contain rules and ratings of the installed module;

e) an interface to allow users to assign a weight to each computer to assist module ranking and updating with the module update;

f) an interceptor component that intercepts load operation of the installed module while loading an application;

g) said rule table contains a rule that marks any module as unsafe to load if the module is not a member of an approved list;

h) said rule table contains a rule that marks a module as safe to load if the more than a set number of computers in a network are using the module;

i) said rule table contains a rule that marks a module as unsafe to load if the module is installed on less than a set number of computers;

j) a computer acting as a master framework server by communicating with multiple computer systems to share and distribute rules;

k) said rule table contains a rule for application modules that contains licensing information and how to update the module;

l) said rule table contains a rule that marks a module safe if the module is installed on a particular system marked as highly trusted;

m) means to extract a matching rule for the installed module from the rule table and to apply the matching rule to discontinue application loading if a module is unsafe, or to continue application loading with an updated module if the module needs to be replaced.

14. A system as recited in claim 13, wherein rating component rates a module with high ranking if the module is found on a set of designated computers.

* * * * *